United States Patent [19]

Ichikawa

[11] 4,300,735
[45] Nov. 17, 1981

[54] TAPE RECORDER
[75] Inventor: Hiroki Ichikawa, Hachioji, Japan
[73] Assignee: Olympus Optical Co., Ltd., Tokyo, Japan
[21] Appl. No.: 87,962
[22] Filed: Oct. 25, 1979
[30] Foreign Application Priority Data
  Oct. 27, 1978 [JP] Japan .................. 53-148081[U]
[51] Int. Cl.³ .................. G03B 1/04; G11B 15/32
[52] U.S. Cl. .................. 242/201; 242/206
[58] Field of Search .................. 242/200-204, 242/189, 190, 206; 360/71-73, 96

[56]                References Cited
        U.S. PATENT DOCUMENTS
  3,410,497  11/1968  Lopez-Henriquez ........ 242/200 X
  3,861,620   1/1975  Sekiguchi .................. 242/189
  3,862,729   1/1975  Staar ........................ 242/206
  3,877,074   4/1975  Guttinger .................. 360/96

Primary Examiner—Leonard D. Christian
Attorney, Agent, or Firm—Toren, McGeady & Stanger

[57]                ABSTRACT

In a driving mechanism for a tape recorder, rewinding operation of the tape at high speed may be effected by moving a fast-feed operation member to activate both a main switch and a high-speed switch to effect high speed driving of a tape rewinding reel. A first rotary lever is adapted to be actuated either by the fast-feed operating member to actuate the main switch or by a changeover operation member which sets the driving mechanism to the rewinding position. A tape driving member for transmitting tape driving force to either a tape winding reel or the tape rewinding reel is pivotally actuated by a second rotary lever which is also adapted to be responsive to the changeover operation member.

4 Claims, 5 Drawing Figures

TAPE RECORDER

BACKGROUND OF THE INVENTION

1. Field of the Invention

This invention relates to a tape recorder and more particularly to a tape recorder which enables the tape rewinding speed to be changed.

2. Description of Prior Art

In recent years very small tape recorders have come into wide use. Since these tape recorders are compact and portable, many of them are used for recording conferences and lectures. It frequently occurs that important portions of a recorded tape are repeatedly replayed by rewinding the tape. Ordinarily, tape recorders are designed so that the tape is rewound completely at a high tape rewinding speed.

For this reason, when it is desired to replay an important portion of the recorded tape repeatedly, the tape must be repeatedly rewound to select the desired portion.

SUMMARY OF THE INVENTION

An object of the present invention is to eliminate the above described defect of a tape recorder.

Another object of this invention is to provide a tape recorder in which the tap rewinding speed can be selectively changed between high speed and low speed thereby enabling the desired portion of the recorded tape to be selected accurately and efficiently.

The tape recorder according to this invention comprises a changeover operation member for rewinding the tape, a fast-feed operation member for feeding the tape at high speed, a first rotary lever linked with the changeover operation member and the fast-feed operation member for rotary movement, a second rotary lever linked with the changeover operation member for rotary movement, a tape driving member linked with the second rotary lever for transmitting the tape driving force either to the tape winding reel or the tape rewinding reel, a main switch which responds to the rotary movement of the first rotary lever to set low the tape driving speed, and a high-speed switch linked with the fast-feed operation member for setting the tape driving speed at high speed. The changeover operation member and the fast-feed operation member are operation buttons that can be slidably operated. The first and second rotary levers are rotatably supported on the same shaft. The tape driving member comprises a third rotary lever linked with and rotated by the second rotary lever, a first friction roller supported on the third rotary lever and engaged with the tape winding reel for transmitting the tape driving force thereto, and a second friction roller supported on the third rotary lever and brought into engagement, by the rotation of the lever, with the tape rewinding reel for transmitting the tape driving force thereto.

DESCRIPTION OF THE PREFERRED EMBODIMENT

Figure 1:
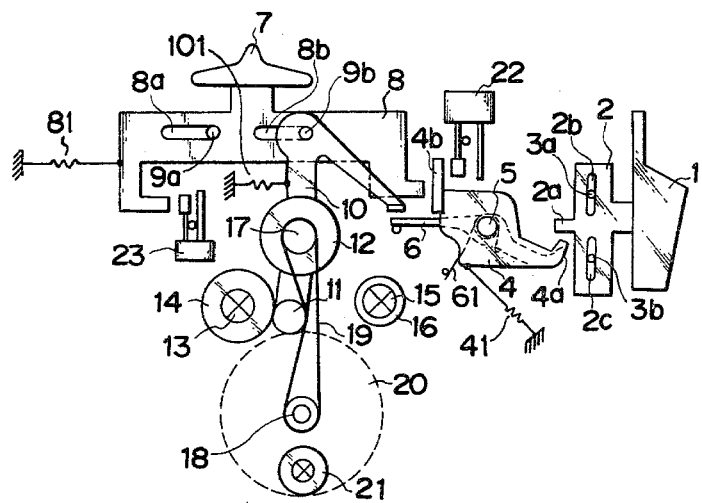
FIG. 1 is a schematic view showing the construction of the embodiment of the tape recorder according to this invention when the tape is stopped.

Referring to FIG. 1, reference numeral 1 represents a changeover operation member, such as an operation button, with a lever 2. The lever 2 has a projection 2a protruding from its side and a pair of slots 2b, 2c which receive pins 3a, 3b secured to the base plate (not shown) in such a manner that these pins can be slid vertically along the slots.

Figure 2:
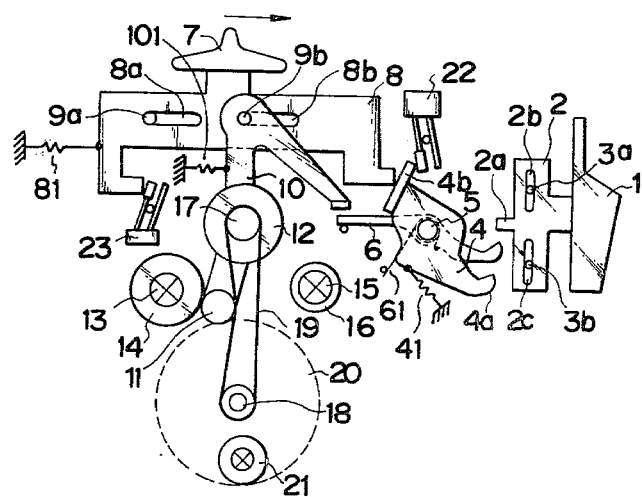
FIG. 2 is a schematic view showing the construction of the same embodiment of the tape recorder when the tape is fed at high speed.

When the selection button 1 is set at the tape-stop position, the lever will assume a position shown in FIG. 2. The lever 2 will move upward when the operation button 1 is set at the play position and move downward when set at the tape-rewind position.

Facing the lever 2 is a first rotary lever 4 rotatably supported on a shaft 5 and which has a claw 4a at one end for engagement with the projection 2a of the lever 2 and at the other end an erected portion 4b. The rotary lever 4 is biased counterclockwise by a spring 41 to take the position shown in the figure. The rotary lever 4 can be rotated clockwise by the downward displacement of the lever 2 i.e., by setting the operating button 1 at the tape-rewinding position.

Also rotatably suported on the shaft 5 is a second rotary lever 6 which is biased counterclockwise by a spring 61 and is maintained at the position shown in the figure. Downward movement of the lever 2 brings the projection 2a into engagement with the rotary lever 6 and rotates the latter clockwise. The second rotary lever 6 is made to rotate independently of the first rotary lever 4.

Denoted by 7 is a fast-feed operation member such as a button for feeding the tape at high speed. It is secured to a lever 8, which has a pair of slots 8a, 8b in which pins 9a, 9b secured to the base plate (not shown) are received so as to be slidable sideways along the slots.

The lever 8 is biased toward the left by a spring 81 and is held at the position shown in FIG. 1. When the fast-feed button 7 is slid toward the right the lever 8 presses against the erected portion 4b of the rotary lever 4 to rotate it clockwise.

Rotatably supported on the pin 9b is a third rotary lever 10 which constitutes a tape driving member and is biased clockwise by a spring 101. The rotary lever 10 can be rotated counterclockwise by the clockwise rotation of the lever 6 and is provided with two friction rollers 11, 12. The friction roller 11 is engaged with a friction roller 14 on a tape winding reel 13. The other friction roller 12 comes into engagement with a friction roller 16 on the tape rewinding reel 15 when the rotary lever 10 is rotated counterclockwise.

The friction roller 12 is provided with a pulley 17. A belt 19 runs around the pulley 17 and the capstan shaft 18 by way of the friction roller 11 disposed therebetween. The capstan shaft 18 is rotated with a flywheel 20 by the motor 25. 21 is a pinch roller.

Figure 5:
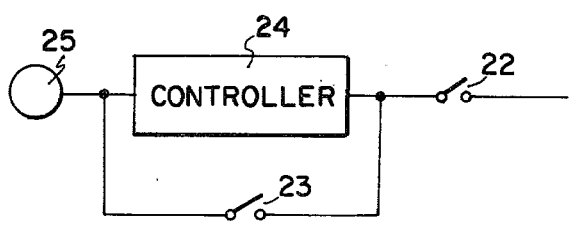
FIG. 5 is a schematic view of the motor controller circuitry.

A main switch 22 is provided close to the erected portion 4b of the rotary lever 4, and is adapted to be turned on by the clockwise rotation of the rotary lever 4. When the main switch 22 is turned on, a motor 25 shown in FIG. 5 is started and controlled by a controller 24 to run at a constant speed, e.g., at low speed. The controller 24 may be of the type disclosed in U.S. Pat. No. 3,777,244.

A switch 23 for increasing the tape driving speed is provided close to the lever 8 and is adapted to be turned on when the lever 8 is displaced toward the right. When the switch 23 is turned on, the motor 25 becomes free from the control of the controller 24 and runs at high speed.

The operation of the tape recorder with the construction described above will be explained in the following.

In order to feed the tape at high speed when the operation button 1 is set at the stop-position as shown in FIG. 1, the fast-feed button 7 is slid in the direction of the arrow shown in FIG. 2. The lever 8 is then displaced toward the right and presses against the erected portion 4b of the rotary lever 4 to rotate it clockwise, turning on the main switch 22 and starting the motor 25. At the same time, the displacement of the lever 8 turns on the high-speed switch 23 to run the motor at high speed.

As a result, the capstan shaft 18 revolves at high speed with the flywheel 20. At this time, since the rotary lever 6 is not rotated and the rotary lever 10 is biased clockwise, the friction roller 11 remains engaged with the friction roller 14 of the reel 13. Thus, the rotation of the capstan shaft 18 is transmitted to the tape winding reel 13 by way of the belt 19 and the friction roller 11, so that the reel 13 is rotated at high speed to feed the tape fast.

Figure 3:
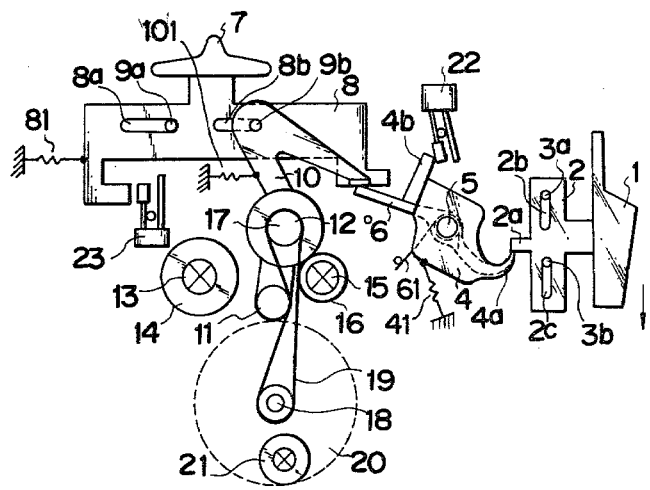
FIG. 3 is a schematic view showing the construction of the same embodiment of the tape recorder when the tape is rewound at low speed.

When the operation button 1 is slid from the position shown in FIG. 1 in the direction of the arrow as shown in FIG. 3 to rewind the tape at a constant speed or at low speed, the projection 2a of the lever 2 is moved downward to press down the claw 4a of the rotary lever 4, with the result that the rotary lever 4 is rotated clockwise. This causes the main switch 22 to be turned on, so that the motor 25 is rotated at low speed and the capstan shaft 18 is also rotated with the flywheel 20 at the low speed. At this time, the downward displacement of the lever 2 causes the rotary lever 6 to rotate clockwise, which in turn rotates the rotary lever 10 counterclockwise, bringing the friction roller 12 into engagement with the friction roller 16 of the tape-rewinding reel 15. Therefore, the slow rotation of the capstan shaft 18 is transmitted to the reel 15 through the belt 19 and the friction roller 12, so that the reel 15 is rotated to rewind the tape at low speed.

Figure 4:
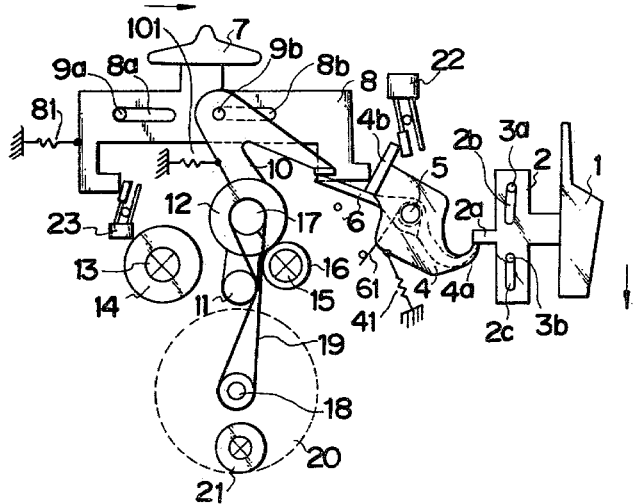
FIG. 4 is a schematic view showing the construction of the same embodiment of the tape recorder when the tape is rewound at high speed.

To increase the tape rewinding speed the fast-feed button 7 is slid in the direction of the arrow as shown in FIG. 4. This causes the lever 8 to move toward the right, so that the high-speed switch 23 is turned on to run the motor at high speed. As a result, the capstan shaft 18 is rotated at high speed with the flywheel 20 and the tape-rewinding reel 15 is rotated to rewind the tape at high speed.

Setting the operation button 1 at the rewinding position and sliding the fast-feed button 7 rotate the reel 15 and thereby enables the tape to be rewound at high speed.

With this construction the tape rewinding speed can be set either at high speed or low speed as is necessary, so that the exact portion of the recorded tape that one wants to hear can be picked up by slowly rewinding the tape. The low-speed rewinding helps prevent the tape from being rewound excessively and ensures accurate and efficient tape rewinding. When one wants to rewind the tape completely, he can do it quickly by sliding the fast-feed button 7.

Though one preferred embodiment of the invention has been shown and described herein, it should be noted that many changes and modifications may be made therein without departing from the spirit of the invention and the scope of the appended claims.

What is claimed is:

1. A tape recorder having a driving mechanism for enabling tape rewinding at a higher speed and a lower speed comprising: a tape winding reel; a tape rewinding reel; a changeover operation member adapted to be set to effect rewinding of said tape; a fast-feed operation member adapted to effect feeding of said tape at said higher speed; a main switch adapted to set said driving mechanism for operation at said lower speed; a high-speed switch adapted to be actuated by said fast-feed operation member to set said driving mechanism for operation at said higher speed; a first rotary lever adapted to actuate said main switch in response to actuation of said first rotary lever by said changeover operation member; a second rotary lever adapted to be engaged by said changeover operation member when said changeover operation member is set to effect rewinding of said tape; and a tape driving member for transmitting a tape driving force to either said tape winding reel or said tape rewinding reel, said tape driving member being actuated by said second rotary lever to transmit a tape driving force to said tape rewinding reel in response to actuation thereof by said second rotary lever.

2. A tape recorder as set forth in claim 1, wherein said changeover operation member and said fast-feed operation member comprise operation buttons that can be slidably activated.

3. A tape recorder as set forth in claim 1, wherein said first and second rotary levers are rotatably supported on the same shaft.

4. A tape recorder as set forth in claim 1, wherein said tape driving member comprises a third rotary lever engaged and rotated by said second rotary lever, a first friction roller suported on said third rotary lever and engaged with said tape winding reel for transmitting a tape driving force thereto, and a second friction roller supported on said third rotary lever and brought into engagement, by rotation of said third rotary lever, with said tape rewinding reel for transmitting a tape driving force thereto.

* * * * *